H. R. VAN BOCHOVE.
PASTRY UTENSIL.
APPLICATION FILED DEC. 29, 1913.

1,126,134.

Patented Jan. 26, 1915.

Witnesses:
Stanley K. Wood
R. W. Wenzell

Inventor,
Henry R. Van Bochove
By Walter S. Wood
Att'y.

THE NORRIS PETERS CO., PHOTO-LITHO., WASHINGTON, D. C.

UNITED STATES PATENT OFFICE.

HENRY R. VAN BOCHOVE, OF KALAMAZOO, MICHIGAN.

PASTRY UTENSIL.

1,126,134.   Specification of Letters Patent.   Patented Jan. 26, 1915.

Application filed December 29, 1913. Serial No. 809,314.

*To all whom it may concern:*

Be it known that I, HENRY R. VAN BOCHOVE, citizen of the United States, residing at the city of Kalamazoo, county of Kalamazoo, and State of Michigan, have invented a new and useful Pastry Utensil, of which the following is a specification.

My invention relates to a device for cutting dough into suitable shape for cakes, cookies, doughnuts, biscuits, etc., before baking.

It has for its objects, simplicity of construction and cheapness of manufacture; ease with which the dough will dislodge itself from the cutter after being cut; greater efficiency, durability and sanitation, all parts being of integral construction.

Other objects will more definitely appear in the detail description to follow.

I accomplish these objects by the devices and means described in this specification and definitely pointed out in the claims.

Figure 1:
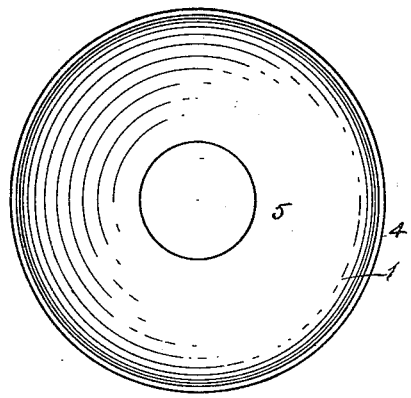
Figure 2:
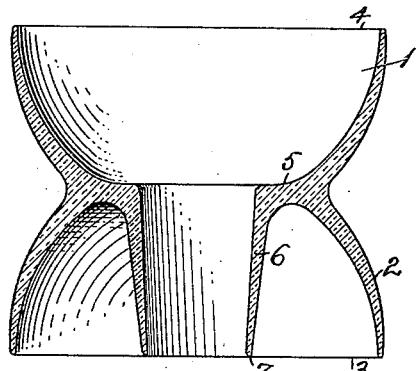
Figure 3:
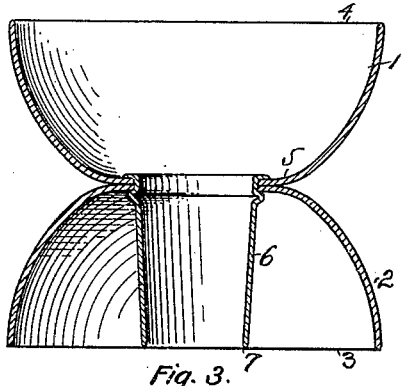

Structures embodying the features of my invention are clearly illustrated in the accompanying sheet of drawings forming a part of this specification, in which:

Figure 1 is a plan view. Fig. 2 is a central vertical section, and Fig. 3 is a similar section, illustrative of a modified structure which will be more definitely referred to hereinafter.

Similar reference characters refer to similar parts throughout the several views.

In the construction of my pastry utensil I employ two, substantially hemispherical cups 1 and 2, and provided with the cutting edges 3 and 4. A portion of the peripheral surface of these cups, opposite to and parallel with their cutting edges, are joined together as at 5, thus forming a neck portion between the two cups while their cutting edges shall lie in substantially opposing parallel planes. An opening is provided in the neck portion 5 of these cups to which is integrally secured the central cutting tube 6, which extends through one of the cups (in this case cup 2) until its cutting edge 7 shall lie in the same plane as the cutting edge of the cup through which it extends and parallel therewith.

It will be observed that the inner wall of the cutting tube 6 is tapering from the smaller diameter at its cutting edge 7 to a larger diameter at the inner surface of cup 1, and also, that its outer surface is tapered in conformity therewith. This is for the purpose of allowing the cores cut from the dough to move up freely in said tube and permit of their easy dislodgment therefrom by simply reversing the position of the cutter. It will also be apparent that the hemispherical surface of the inside of the cutting cups, together with the outside taper of the cutting tube 6 permits of the free and easy dislodgement of the cut dough from said cups and precludes the necessity for holes in the walls of said cups to permit the insertion of the finger to remove the cut dough therefrom, a very important feature, both from a sanitary point of view as well as that of saving of time in cutting the dough.

As illustrated, cup 1 is intended to cut biscuits or cakes without a central hole, while cup 2 is intended to cut doughnuts or cakes with a central hole.

The structure shown in Fig. 2 is particularly adapted to be made of any suitable material that can be molded, while that shown in Fig. 3 is particularly adapted to be made of stamped sheet metal, all parts being integral when finished either of which possess the same advantages. The shape of either structure owing to the reduced or neck portion makes the device easy to grasp and hold while using, besides when made of glass or porcelain or stamped metal with an enamel or granite finish would be extremely easy of sanitation after using.

It will be obviously apparent that minor changes in construction may be resorted to, such as form and proportion, without departing from the essential features of my invention. The size of the cutting cups may be of different sizes and their cutting edges made scalloped. Also the central cutting tube with its opening through the joined portion of the cutting cups might be dispensed with, if desirable to make such cutter. Also, only the inside of the cutting cups require to be hemispherical in shape, in point of efficiency.

Having thus described my invention, what I claim as new and desire to secure by Letters Patent, is—

1. A pastry utensil consisting of oppositely disposed hemispherical cups joined integrally so as to form a neck portion provided with cutting edges, a tube concentrically spaced with relation to the cutting edges of said cups and extending from the inner surface of one of said cups through the opposing cup and provided with a cutting edge which shall lie parallel to and in the same plane as that of the cutting edge of the cup through which it extends, said tube being tapered from its cutting edge to a larger diameter at the point of joining the neck portion of said cups.

2. A pastry utensil consisting of oppositely disposed hemispherical cups integrally joined so as to form a neck portion and provided with cutting edges, a tube concentrically spaced with relation to the cutting edges of said cups and extending from the inner surface of one of said cups through the opposing cup and provided with a cutting edge which shall lie parallel to and in the same plane as that of the cutting edge of the cup through which it extends.

3. A pastry utensil consisting of oppositely disposed hemispherical cups integrally joined so as to form a neck portion and provided with cutting edges, and an opening between said cups concentrically located with relation to their cutting edges.

4. A pastry utensil consisting of oppositely disposed cups of different sizes integrally joined so as to form a neck portion and whose inner surface shall be substantially hemispherical and provided with cutting edges, a tube concentrically spaced with relation to the cutting edges of said cups and extending from the inner surface of one of said cups through the opposing cup and provided with a cutting edge in alinement with that of the cup through which it extends.

5. A pastry utensil consisting of oppositely disposed cups of different sizes integrally joined so as to form a neck portion whose inner surface shall conform substantially to a hemisphere and provided with cutting edges, a tapering tube concentrically located with relation to the cutting edges of said cups integrally joined to said neck portion and extending from the inner surface of one of said cups through the opposing cup and provided with a cutting edge in alinement with that of the cup through which it extends.

6. A pastry utensil consisting of oppositely disposed cups integrally joined so as to form a neck portion, whose inner surface shall conform substantially to that of a hemisphere and provided with opposing cutting edges.

In testimony whereof I affix my signature in presence of two witnesses.

HENRY R. VAN BOCHOVE.

Witnesses:
F. B. ORCUTT,
FRANK B. STARRING.

Copies of this patent may be obtained for five cents each, by addressing the "Commissioner of Patents, Washington, D. C."